(12) United States Patent
Park (10) Patent No.: US 12,217,911 B2
(45) Date of Patent: Feb. 4, 2025

(54) DIELECTRIC COMPOSITION AND MULTILAYER CAPACITOR INCLUDING THE SAME

(71) Applicant: SAMSUNG ELECTRO-MECHANICS CO., LTD., Suwon-si (KR)

(72) Inventor: Jeong Yun Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 436 days.

(21) Appl. No.: 17/246,274

(22) Filed: Apr. 30, 2021

(65) Prior Publication Data

US 2022/0139623 A1    May 5, 2022

(30) Foreign Application Priority Data

Nov. 3, 2020    (KR) .................. 10-2020-0145461

(51) Int. Cl.
*H01G 4/12*    (2006.01)
*C04B 35/468*    (2006.01)
(Continued)

(52) U.S. Cl.
CPC ....... *H01G 4/1227* (2013.01); *C04B 35/4682* (2013.01); *H01G 4/248* (2013.01); *H01G 4/30* (2013.01); *C04B 2235/3206* (2013.01); *C04B 2235/3208* (2013.01); *C04B 2235/3224* (2013.01); *C04B 2235/3236* (2013.01); *C04B 2235/442* (2013.01); *C04B 2235/785* (2013.01)

(58) Field of Classification Search
CPC ........ H01G 4/1227; H01G 4/248; H01G 4/30; C04B 35/4682; C04B 2235/3206; C04B 2235/3208; C04B 2235/3224; C04B 2235/3236; C04B 2235/442; C04B 2235/785

USPC ................ 361/301.4, 311, 312, 321.1, 321.5
See application file for complete search history.

(56) References Cited

U.S. PATENT DOCUMENTS 9,818,545 B2    11/2017 Sato et al.
2004/0145856 A1*    7/2004 Nakamura ............... H01G 4/30
361/311

(Continued)

FOREIGN PATENT DOCUMENTS

JP    2001039765 A    *    2/2001   ......... C04B 35/4682
JP    5182531 B2    1/2013
(Continued)

OTHER PUBLICATIONS

Y. Furukawa, et al., "Effect of Wettability of Grains by a Liquid Phase on Grain Growth Behavior of La-Doped SrTiO3 Ceramics," Journal of the Ceramic Society of Japan, No. 104, vol. 9, 1996, pp. 900-903.

(Continued)

*Primary Examiner* — Arun Ramaswamy
(74) *Attorney, Agent, or Firm* — MORGAN, LEWIS & BOCKIUS LLP (57) ABSTRACT

There are provided a dielectric composition and a multilayer capacitor including the same. The dielectric composition contains: barium titanate ($BaTiO_3$); and 0.6 to 0.9 mol of calcium (Ca) and 0.5 to 2.0 mol of magnesium (Mg) based on 100 mol of barium titanate.

14 Claims, 6 Drawing Sheets

(51) Int. Cl.
*H01G 4/248* (2006.01)
*H01G 4/30* (2006.01)

(56) References Cited

U.S. PATENT DOCUMENTS

| | | | | |
|---|---|---|---|---|
| 2010/0084619 | A1* | 4/2010 | Katsu | C04B 35/46 |
| | | | | 423/598 |
| 2010/0165541 | A1 | 7/2010 | Sasabayashi et al. | |
| 2012/0081836 | A1* | 4/2012 | Yamaguchi | H01G 4/30 |
| | | | | 501/139 |
| 2017/0186547 | A1* | 6/2017 | Sato | H01G 4/30 |
| 2017/0186548 | A1* | 6/2017 | Sato | C04B 35/4682 |
| 2018/0130601 | A1* | 5/2018 | Kim | H01G 4/33 |
| 2018/0308637 | A1* | 10/2018 | Nishigaki | C04B 41/009 |

FOREIGN PATENT DOCUMENTS

| | | | | |
|---|---|---|---|---|
| JP | 2017-120854 A | 7/2017 | | |
| KR | 10-1932416 B1 | 12/2018 | | |
| WO | WO-2009119444 A1 * | 10/2009 | ......... | C04B 35/4682 |

OTHER PUBLICATIONS

J-K Kee, et al., "Roles of Ba/Ti Ratios in the Dielectric Properties of BaTiO3 Ceramics," J. Am Ceram Soc., No. 84, vol. 9, 2001, pp. 2001-2006.

Y. Sakabe, et al., "Dielectric Properties of Fine-Grained BaTiO3 Ceramics Doped with CaO," Japan J. Appl. Phys., vol. 41, 2002, pp. 6922-6925.

Korean Office Action dated Aug. 8, 2024 issued in Korean Patent Application No. 10-2020-0145461 (with English translation).

* cited by examiner

Prior Art

DIELECTRIC COMPOSITION AND MULTILAYER CAPACITOR INCLUDING THE SAME

CROSS-REFERENCE TO RELATED APPLICATION(S)

This application claims benefit of priority to Korean Patent Application No. 10-2020-0145461 filed on Nov. 3, 2020 in the Korean Intellectual Property Office, the disclosure of which is incorporated herein by reference in its entirety.

BACKGROUND

1. Field

The present disclosure relates to a dielectric composition and a multilayer capacitor including the same.

2. Description of Related Art

A multilayer capacitor is an electronic component using a dielectric material. Recently, in accordance with the trend for electronic products in which the multilayer capacitor is provided, multilayer capacitors have been required to be miniaturized and highly integrated.

In order to miniaturize and highly integrate multilayer capacitors, a dielectric layer and an internal electrode constituting a multilayer capacitor need to be thinned.

However, when the dielectric layer is thinned, a strength of an electric field applied to the dielectric layer under the same voltage application conditions is increased, such that a withstand voltage of the multilayer capacitor may be decreased, reliability of the multilayer capacitor may be deteriorated, and direct current (DC)-bias characteristics of the multilayer capacitor may be deteriorated.

SUMMARY

An aspect of the present disclosure may provide a dielectric composition capable of significantly reducing a decrease in a withstand voltage, deterioration of reliability, and deterioration of direct current (DC)-bias characteristics of a multilayer capacitor even though a dielectric layer is formed to have a low thickness, and a multilayer capacitor including the same.

According to an aspect of the present disclosure, a dielectric composition may contain: barium titanate ($BaTiO_3$); 0.6 to 0.9 mol of calcium (Ca) and 0.5 to 2.0 mol of magnesium (Mg) based on 100 mol of barium titanate.

The dielectric composition may further contain dysprosium (Dy) and terbium (Tb).

According to another aspect of the present disclosure, a multilayer capacitor may include: a body including dielectric layers and internal electrodes; and external electrodes disposed on the body so as to be connected to the internal electrodes, wherein the dielectric layer includes a plurality of dielectric grains each containing barium titanate ($BaTiO_3$) and 0.6 to 0.9 mol of calcium (Ca) and 0.5 to 2.0 mol of magnesium (Mg) based on 100 mol of barium titanate.

An average thickness of the dielectric layer may be 0.4 µm or less.

Each of the dielectric grains may have a size of 150 nm or less.

Four or more layers of dielectric grains may be disposed in the dielectric layer in a direction in which the dielectric layer is stacked.

The body may include first and second surfaces opposing each other, third and fourth surfaces connected to the first and second surfaces and opposing each other, and fifth and sixth surfaces connected to the first and second surfaces, and connected to the third and fourth surfaces, and opposing each other, and the internal electrodes may include first and second external electrodes exposed to the third and fourth surfaces of the body, respectively.

The external electrodes may include: a pair of connected portions disposed on the third and fourth surfaces of the body, respectively; and a pair of band portions respectively extending from the pair of connected portions to the first surface of the body.

The body may include: an active region including the first and second internal electrodes; and upper and lower covers disposed on upper and lower surfaces of the active region, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

The present disclosure relates to a dielectric composition, and a multilayer capacitor including a dielectric composition according to an exemplary embodiment in the present disclosure will also be hereinafter described.

Hereinafter, directions of a multilayer capacitor will be defined in order to clearly describe an exemplary embodiment in the present disclosure. X, Y and Z in the drawings refer to a length direction, a width direction, and a thickness direction of a body 110, respectively.

In addition, in the present exemplary embodiment, the Z direction may be used as the same concept as a stacking direction in which dielectric layers 111 are stacked.

Figure 1:
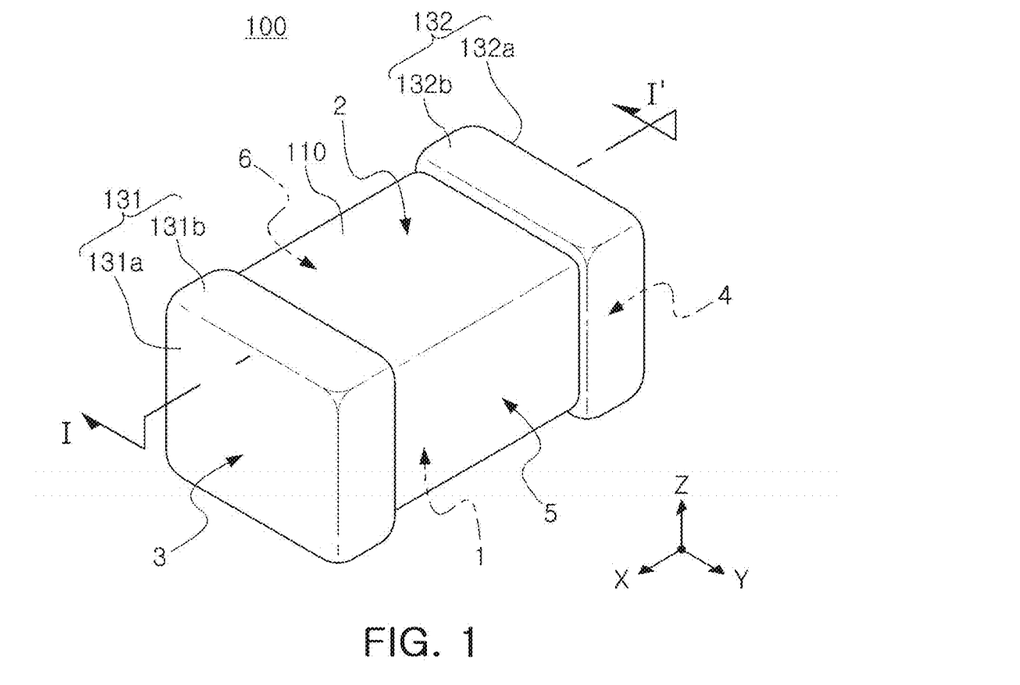
FIG. 1 is a schematic perspective view illustrating a multilayer capacitor according to an exemplary embodiment in the present disclosure.
Figure 2:
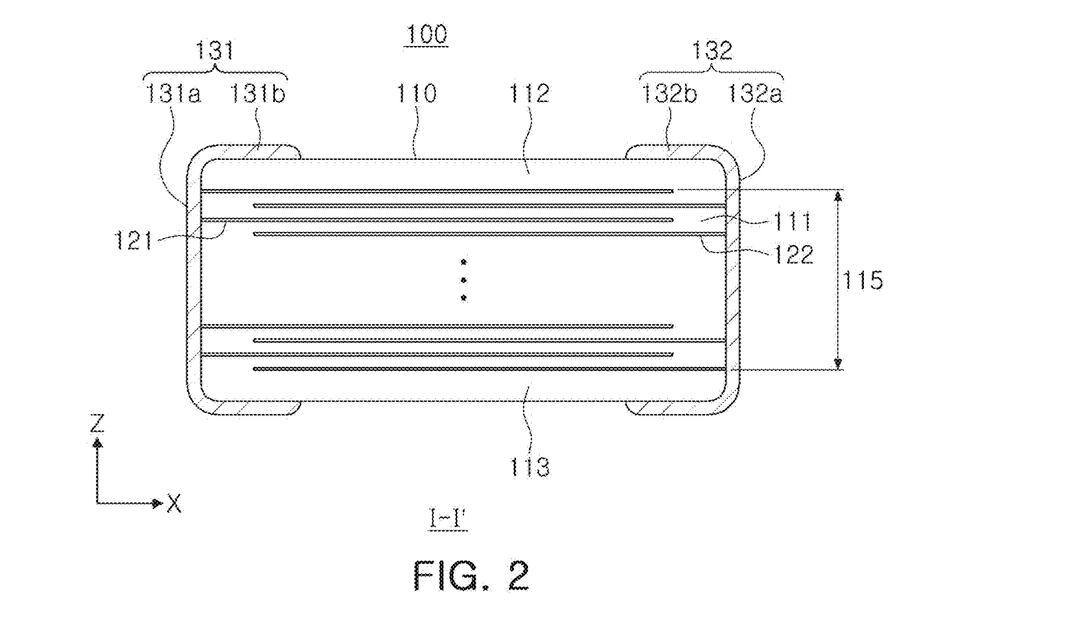
FIG. 2 is a cross-sectional view taken along line I-I' of FIG. 1.
Figure 3:
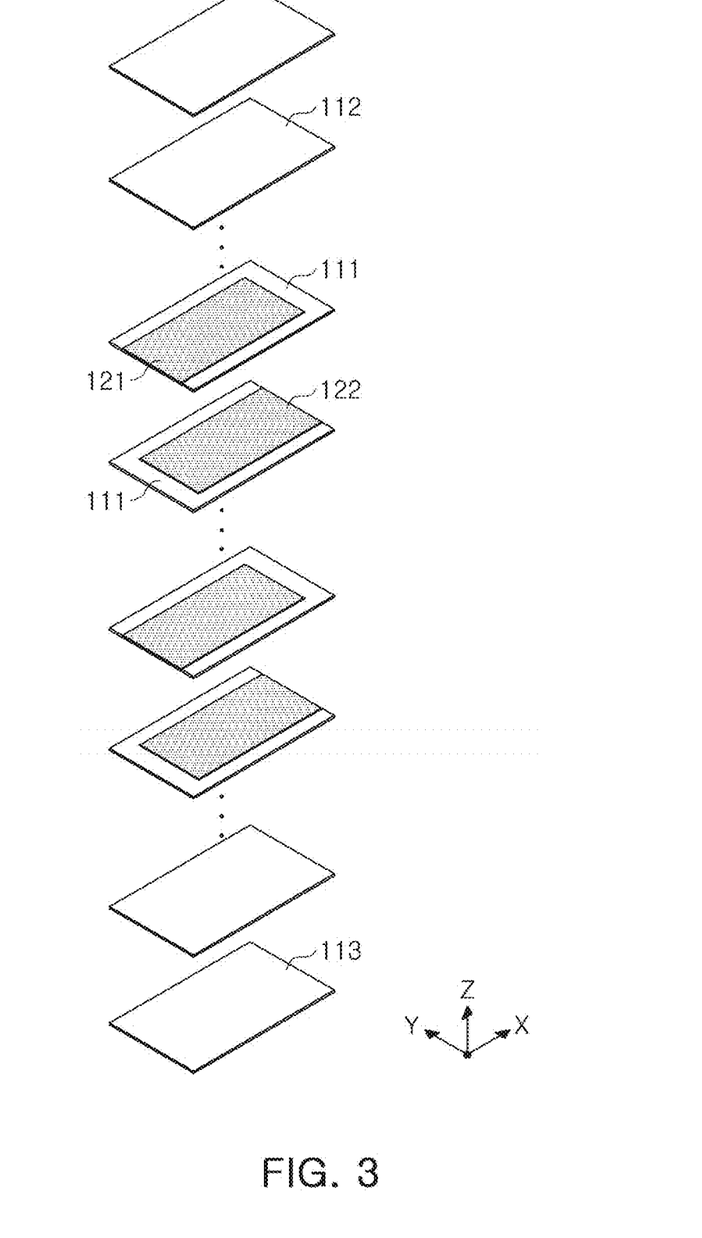
FIG. 3 is an exploded perspective view illustrating structures of dielectric layers and internal electrodes of a body according to the exemplary embodiment in the present disclosure.

FIG. 1 is a schematic perspective view illustrating a multilayer capacitor according to an exemplary embodiment in the present disclosure, FIG. 2 is a cross-sectional view taken along line I-I' of FIG. 1, and FIG. 3 is an exploded perspective view illustrating structures of dielectric layers and internal electrodes of a body according to the exemplary embodiment in the present disclosure.

Referring to FIGS. 1 through 3, the multilayer capacitor 100 according to the present exemplary embodiment may include a body 110 including a plurality of dielectric layers 111 and first and second internal electrodes 121 and 122; and first and second external electrodes 131 and 132.

The body 110 may be formed by stacking and then sintering the plurality of dielectric layers 111 in the Z direction, and adjacent dielectric layers 111 of the body 110 may be integrated with each other so that boundaries therebetween are not readily apparent without using a scanning electron microscope (SEM).

In this case, the body 110 may have a substantially rectangular parallelepiped shape, but is not limited thereto.

In addition, a shape and a dimension of the body 110 and the number of stacked dielectric layers 111 are not limited to those illustrated in the drawings of the present exemplary embodiment.

In the present exemplary embodiment, for convenience of explanation, first and second surfaces 1 and 2 of the body 110 refer to opposite surfaces of the body 110 opposing each other in the Z direction, third and fourth surfaces 3 and 4 of the body 110 refer to opposite surfaces of the body 110 connected to the first and second surfaces 1 and 2 and opposing each other in the X direction, and fifth and sixth surfaces 5 and 6 of the body 110 refer to opposite surfaces of the body 110 connected to the first and second surfaces 1 and 2, connected to the third and fourth surfaces 3 and 4, and opposing each other in the Y direction.

In the present exemplary embodiment, a mounting surface of the multilayer capacitor 100 may be the first surface 1 of the body 110.

The dielectric layer 111 included in such a body 110 may contain a dielectric composition.

In this case, an average thickness of the dielectric layer 111 may be 0.4 μm or less.

In addition, each of dielectric grains included in the dielectric layer 111 may have a size of 150 nm or less.

As the size of the dielectric grain is reduced within the range described above, four or more layers of dielectric grains may be disposed in the dielectric layer 111 in the Z direction, the stacking direction, even though the dielectric layer 111 is formed at a small thickness of 0.4 μm or less.

In addition, the body 110 may include an active region 115, which contributes to forming capacitance of the multilayer capacitor, and upper and lower covers 112 and 113 formed as upper and lower margin portions on upper and lower surfaces of the active region 115, respectively, in the Z direction.

The upper and lower covers 112 and 113 may be formed of the same material as the dielectric layers 111 of the active region 115 and have the same configuration as the dielectric layers 111 of the active region 115 except that they do not include the internal electrodes.

In this case, the upper and lower covers 112 and 113 may be formed by stacking a single dielectric layer or two or more dielectric layers on the upper and lower surfaces of the active region 115 in the Z direction, respectively.

The upper and lower covers 112 and 113 may basically serve to prevent the first and second internal electrodes 121 and 122 from being damaged by physical or chemical stress.

The first and second internal electrodes 121 and 122, which are electrodes having different polarities, may be alternately disposed in the Z direction with each of the dielectric layers 111 interposed therebetween, and one ends of the first and second internal electrodes 121 and 122 may be exposed through the third and fourth surfaces 3 and 4 of the body 110, respectively.

In this case, the first and second internal electrodes 121 and 122 may be electrically insulated from each other by each of the dielectric layers 111 disposed therebetween.

In addition, end portions of the first and second internal electrodes 121 and 122 alternately exposed through the third and fourth surfaces 3 and 4 of the body 110, respectively, may be electrically connected to the first and second external electrodes 131 and 132 disposed on the third and fourth surfaces 3 and 4 of the body 110, respectively.

According to the configuration as described above, when predetermined voltages are applied to the first and second external electrodes 131 and 132, electric charges may be accumulated between the first and second internal electrodes 121 and 122.

In this case, capacitance of the multilayer capacitor 100 may be in proportion to an area of the first and second internal electrodes 121 and 122 overlapping each other in the Z direction in the active region 115.

The first and second external electrodes 131 and 132 to which voltages having different polarities are provided may be disposed on opposite end portions of the body 110 in the X direction, respectively, and may be electrically connected to the end portions of the first and second internal electrodes 121 and 122 exposed through third and fourth surfaces of the body 110, respectively, to constitute a capacitor circuit.

The first external electrode 131 may include a first connected portion 131a and a first band portion 131b.

The first connected portion 131a may be formed on the third surface 3 of the body 110 and be connected to the exposed portions of the first internal electrodes 121, and the first band portion 131b may extend from the first connected portion 131a to a part of the first surface 1 of the body 110, the mounting surface of the body 110.

In this case, the first band portion 131b may further extend to parts of the fifth and sixth surfaces 5 and 6 of the body 110 and a part of the second surface 2 of the body 110 in order to improve a fixing strength, or the like.

The second external electrode 132 may include a second connected portion 132a and a second band portion 132b.

The second connected portion 132a may be formed on the fourth surface 4 of the body 110 and be connected to the exposed portions of the second internal electrodes 122, and the second band portion 132b may extend from the second connected portion 132a to a part of the first surface 1 of the body 110, the mounting surface of the body 110.

In this case, the second band portion 132b may further extend to parts of the fifth and sixth surfaces 5 and 6 of the body 110 and a part of the second surface 2 of the body 110 in order to improve a fixing strength, or the like.

In addition, the first and second external electrodes 131 and 132 may include conductive layers formed on the third and fourth surfaces 3 and 4 of the body 110 and plating layers formed on the conductive layers, respectively, if necessary.

In this case, the plating layer may include a nickel (Ni) plating layer formed on the conductive layer and a tin (Sn) plating layer formed on the nickel (Ni) plating layer.

Meanwhile, in the present exemplary embodiment, the dielectric layer 111 included in the body 110 may contain a non-reducible dielectric composition, and the non-reducible dielectric composition may further contain various oxide and carbonate additives.

The dielectric composition according to the exemplary embodiment in the present disclosure will hereinafter be more specifically described.

The dielectric composition according to the present exemplary embodiment may contain barium titanate $BaTiO_3$ (BT) as a main component of the dielectric composition.

In addition, the dielectric composition according to the present exemplary embodiment may contain 0.6 to 0.9 mol of calcium (Ca) and 0.5 to 2.0 mol of magnesium (Mg) based on 100 mol of barium titanate.

The calcium (Ca) may serve to decrease grain sizes and a grain size dispersion of the dielectric layer.

In this case, when a content of Ca is less than 0.6 mol based on 100 mol of BT, a problem that pores are increased inside the dielectric layer may occur.

In addition, when a content of Ca exceeds 0.9 mol based on 100 mol of BT, the grain sizes may become large again, and the grain size dispersion may also increase.

The magnesium (Mg), an acceptor, may serve to promote compaction of the dielectric layer and be segregated at grain boundaries to suppress movement of the grain boundaries, thereby suppressing grain growth of the dielectric grains.

When the grain growth of the dielectric grains is uniformly controlled, not only the withstand voltage and reliability of the multilayer capacitor may be improved, but also direct current (DC)-bias characteristics of the multilayer capacitor may be improved.

In this case, when a content of Mg is less than 0.5 mol based on 100 mol of BT, a grain growth suppression effect may be insufficient.

In addition, as represented in Reaction Formula 1, the magnesium (Mg) may act as an acceptor when dissolved in a Ti site, and a dielectric constant of the dielectric composition may thus be relatively decreased when the content of Mg in the dielectric composition is increased. Therefore, an upper limit value of the content of Mg may be 2.0 mol or less based on 100 mol of BT.

<Reaction Formula 1>

Figure 4:
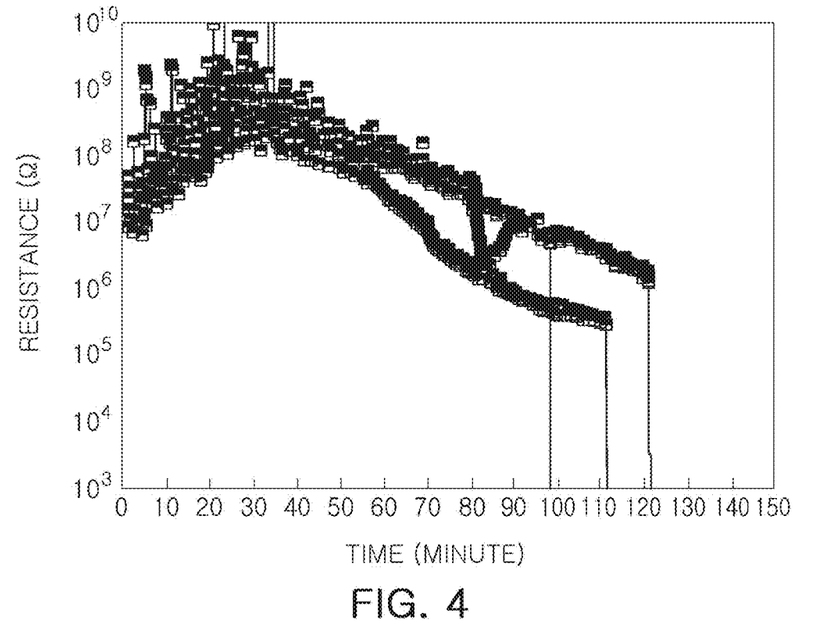
FIG. 4 is graphs illustrating a degree of change in resistance of a multilayer capacitor in which the dielectric layer contains 1.0 mol of magnesium (Mg) based on 100 mol of barium titanate (BT), over time.
Figure 5:
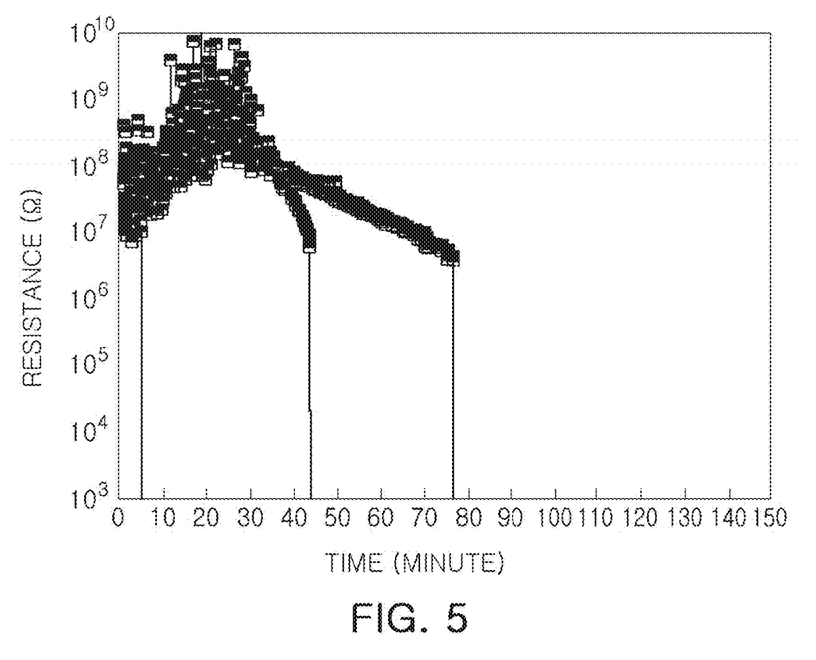
FIG. 5 is graphs illustrating a degree of change in resistance of a multilayer capacitor in which the dielectric layer contains 2.5 mol of Mg based on 100 mol of BT, over time.

FIG. 4 is graphs illustrating resistance of a multilayer capacitor over time when a content of Mg contained in the dielectric composition is 1.0 mol based on 100 mol of barium titanate, and FIG. 5 is graphs illustrating resistance of a multilayer capacitor over time when a content of Mg contained in the dielectric composition is 2.5 mol based on 100 mol of barium titanate.

In this case, the resistance was measured using a step IR (S-IR) device. After both external electrodes of one multilayer capacitor are clamped by a jig formed of a spring, resistance of each chip was continuously measured under a severe condition.

In this case, the resistance was measured while maintaining a temperature at 130° C. and increasing a voltage in a manner such as 5 V/um, 10 V/um, and 15 V/um by applying a voltage of 5V per dielectric thickness. In this case, a holding time for each voltage was 300 seconds.

As illustrated in FIG. 4, when the content of Mg is appropriate (i.e., 2.0 mol or less based on 100 mol of BT), deterioration of insulation resistance (IR) of the multilayer capacitor may be decreased, while as illustrated in FIG. 5, when the content of Mg is excessive, the deterioration of the insulation resistance may not be appropriately prevented.

The deterioration of the insulation resistance may cause a decrease in a withstand voltage of the multilayer capacitor. Therefore, in the present exemplary embodiment, the dielectric composition may contain Mg in the range of 0.5 to 2.0 mol to prevent the deterioration of the insulation resistance. As a result, the decrease in the withstand voltage of the multilayer capacitor may be prevented.

In addition, the dielectric composition according to the present exemplary embodiment may further contain dysprosium (Dy) and terbium (Tb). The dysprosium (Dy) and the terbium (Tb), which are rare earth elements, may be contained in a form of oxide or carbonate. In this case, the form of the oxide or the carbonate is not particularly limited.

Dy and Tb may be dissolved in a lattice of BT to act as donors, thereby serving to improve reliability of the multilayer capacitor.

In addition, Dy and Tb may have a valence of +3 or higher, and may serve to suppress generation of oxygen vacancies due to addition of an acceptor element such as Al or Mg to the dielectric composition or lower a concentration of oxygen vacancies.

When polarization of oxygen vacancy defects occurs, a concentration of oxygen vacancy defects may increase in a negative region, and when the concentration of oxygen vacancy defects exceeds a predetermined level, an n-type semiconductor region may be generated, and the insulation resistance (IR) may be deteriorated by an increase in such an n-type semiconductor region.

In the present exemplary embodiment, Dy and Tb may suppress the generation of the oxygen vacancies or lower the concentration of oxygen vacancies to suppress the deterioration of the IR of the dielectric layer, thereby improving the reliability of the multilayer capacitor.

In this case, a content of Dy may be 0.8 to 2.0 mol based on 100 mol of the dielectric composition, and a content of Tb may be 0.001 to 0.2 mol based on 100 mol of BT.

When the content of Dy exceeds 2.0 mol based on 100 mol of the dielectric composition or the content of Tb exceeds 0.2 mol based on 100 mol of the dielectric composition, the dielectric may become an n-type semiconductor, such that it may be impossible to implement resistance as the dielectric.

In the multilayer capacitor, as a thickness of the dielectric layer is reduced further, an electric field strength applied to the dielectric layer under the same applied voltage may increase, such that the DC-bias characteristics may be deteriorated.

Therefore, in order to implement an effective DC-bias, sizes of grains constituting the dielectric layer need to decrease, and at the same time, uniformity of the grain sizes needs to become high in order to prevent occurrence of a reliability defect due to a burnt. That is, the dielectric layer may preferably implement a uniform non-grain growth system.

As a method of implementing the uniform non-grain growth system described above, there is a method of increasing a ratio of Ba to Ti in the dielectric.

In general, a molar ratio of Ba to Ti in a $BaTiO_3$ base material may have a great influence on dielectric characteristics.

When a content of Ti is high, abnormal grain growth may occur since a liquid phase is formed at a grain boundary at a relatively high temperature.

On the other hand, when a content of Ba is high, the abnormal grain growth may be significantly reduced, such that uniform grain growth may be induced, but a problem such as deterioration of moisture resistance reliability due to a decrease in a compactness may occur.

According to the present exemplary embodiment, the dielectric layer may be formed of a dielectric grain containing barium titanate ($BaTiO_3$) and 0.6 to 0.9 mol of calcium (Ca) and 0.5 to 2 mol of magnesium (Mg) based on 100 mol of barium titanate ($BaTiO_3$), such that wetting of a liquid phase at the time of sintering the dielectric layer may be improved and the dielectric layer may implement the uniform non-grain growth system.

Therefore, even though the average thickness of the dielectric layer is 0.4 µm or less, a change in a dielectric constant of the body according to a change in an external environment may be significantly reduced, such that the decrease in the withstand voltage and the deterioration of the DC-bias characteristics may be prevented.

A thickness of one of the dielectric layers may refer to an average thickness of the dielectric layer disposed between the internal electrodes. The average thickness of the dielectric layer may be measured by image-scanning on a cross-section taken in the length-thickness (L-T) direction of the multilayer body through a scanning electron microscope (SEM) (magnified 10,000 times). The average thickness of the dielectric layer may be acquired by measuring a thickness of a dielectric layer in 50 positions in the length L direction thereof, the 50 positions being located at equal intervals, from the scanned image, and then averaging the values of the measured thickness. The 50 positions located at equal intervals may be determined on a capacity formation portion, referring to a region on which the first and second internal electrodes are overlapped. In addition, in a case in which the measurement of an average value is executed with respect to 5 to 10 dielectric layers, the average thickness of each of the dielectric layers may be more generalized. The thickness of the dielectric layer can be measured by a method other than the method mentioned above, which includes methods appreciated by the one skilled in the art.

In addition, according to the present exemplary embodiment, the compactness may not be lowered in spite of implementing the uniform non-grain growth system, and a problem such as a moisture resistance reliability defect may thus be solved.

In the present exemplary embodiment, the dielectric composition may contain 0.6 to 0.9 mol of Ca based on 100 mol of $BaTiO_3$.

In this case, Ca may be an element equivalent to Ba in $BaTiO_3$, and A-site substitution of Ca for Ba may be easy. Therefore, assuming that Ca is dissolved in a lattice, Ca may induce uniform grain growth while preventing a decrease in a compactness occurring when a content of Ba is high.

In addition even though the A-site substitution of Ca for Ba is not generated, Ca, an element participating in improvement of the wetting of the liquid phase, may help to improve the compactness.

In addition, side effects such as the decrease in the withstand voltage and the deterioration in the reliability of the multilayer capacitor may be suppressed while implementing the uniform non-grain growth system as described above.

Concepts such as a domain and a dipole may be used in implementing dielectric characteristics of a ferroelectric material such as $BaTiO_3$. Basically, dipoles having polarization exist while forming a predetermined region, called a domain.

When grain growth of the grain is suppressed, a domain in the grain may be formed in a small size, dipoles in the domain may be constrained by a DC electric field to be aligned in one direction, and domain switching of dipoles in the domain having a small size in an aligned state by an alternating current (AC) field may be easier than that of dipoles in a domain having a great size, formed in a coarse grain.

According to the present exemplary embodiment, the grain size of the dielectric may be decreased due to the action as described above. Therefore, problems such as the decrease in the withstand voltage and the deterioration of the reliability may be solved, and an effective capacitance change rate due to DC-bias may be decreased.

In this case, each of the dielectric grains of the dielectric layer 111 may have a size of 150 nm or less. The size of the dielectric grains can be measured by taking 2 to 3 points at the center of the chip using SEM, and measuring the size of the dielectric grain with the program Zootos. Zootos can automatically measure the major axis/minor axis of the dielectric grain and then calculate the average size of the dielectric grain. The size of the dielectric grains can be measured by a method other than the method above, which includes methods appreciated by the one skilled in the art.

In addition, when the sizes of the dielectric grains are decreased as described above, four or more layers of dielectric grains may be disposed in at least one dielectric layer in the Z direction, the stacking direction.

Hereinafter, the present disclosure will be described in more detail through Inventive Example and Comparative Examples. However, Inventive Example and Comparative Examples are to assist in the specific understanding of the present disclosure, and the scope of the present disclosure is not limited by Inventive Example and Comparative Examples.

Processes of manufacturing a multilayer capacitor used for experiment are as follows.

First, BT having an average grain size of about 80 nm may be used as a base material of the dielectric composition.

In addition, #1 was a case where the dielectric layer of the body did not contain Ca, #2 was a case where the dielectric layer of the body contained 0.3 mol of Ca based on 100 mol of the base material, #3 was a case where the dielectric layer of the body contained 0.6 mol of Ca based on 100 mol of the base material, #4 was a case where the dielectric layer of the body contained 0.9 mol of Ca based on 100 mol of the base material, and #5 was a case where the dielectric layer of the body contained 1.2 mol of Ca based on 100 mol of the base material.

Further, in the present experiment, in #1 to #5, the base material and Ca were prepared, were mixed with a dispersant using zirconia balls as mixing and dispersion media and using ethanol and toluene as solvents, were boll-milled for about 20 hours, and were then mixed with a binder in order to implement a strength of a dielectric sheet to prepare slurry.

Next, the slurry prepared as described above was used to manufacture a sheet having a thickness of 0.7 µm or less using a small doctor blade-type coater.

Next, internal electrodes were printed on the manufactured sheets, the sheets were stacked as upper and lower covers, respectively, to manufacture a laminate, and a bar was manufactured through a pressing process.

Then, the bar was cut into chips of which a length in the X direction was 0.6 mm and a width in the Y direction was 0.3 mm using a cutter.

Next, the chip was plasticized under an air atmosphere of 400° C. in order to remove the binder, was sintered under a condition of about 1200° C. or less and a hydrogen ($H_2$) concentration of 0.1% or less, and was then re-oxidized at a hydrogen concentration of 0.03%.

Thereafter, a termination process and electrode sintering were performed using a conductive paste to complete a multilayer capacitor.

Figure 6:
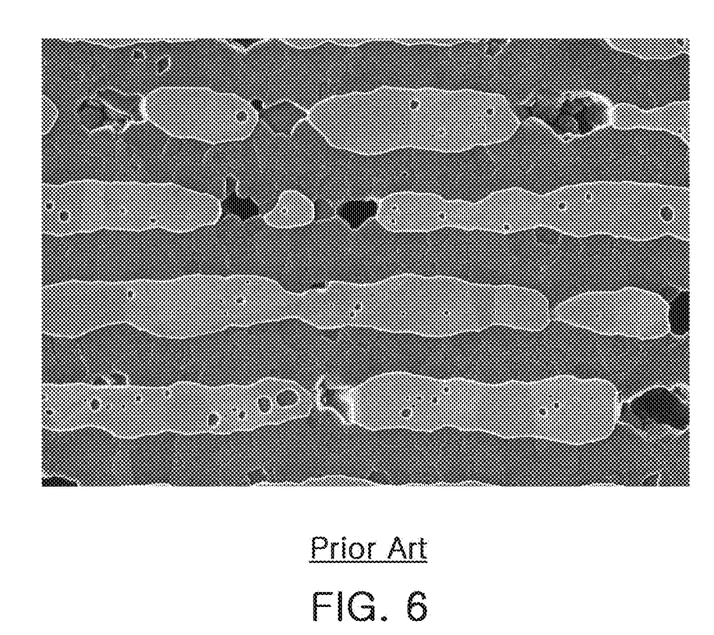
FIG. 6 is a cross-sectional view illustrating a body of a multilayer capacitor in which the dielectric layer does not contain calcium (Ca)

In addition, for each sample, compactnesses of dielectric layers of multilayer capacitors were measured as illustrated in FIGS. 6 though 10.

Figure 7:
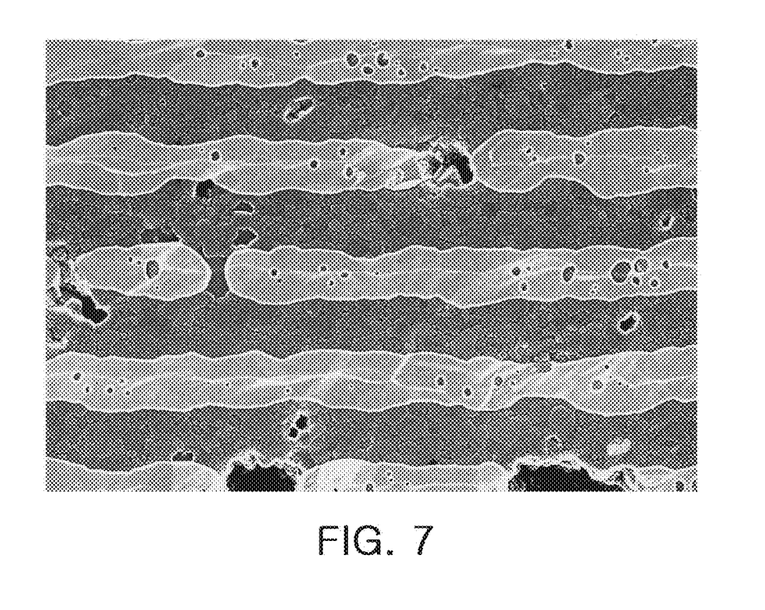
FIG. 7 is a cross-sectional view illustrating a body of a multilayer capacitor in which the dielectric layer contains 0.3 mol of Ca based on 100 mol of BT.
Figure 8:
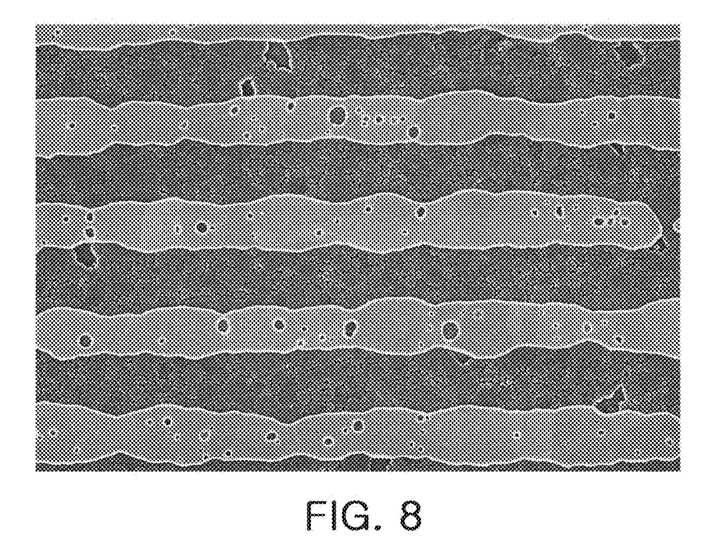
FIG. 8 is a cross-sectional view illustrating a body of a multilayer capacitor in which the dielectric layer contains 0.6 mol of Ca based on 100 mol of BT.
Figure 9:
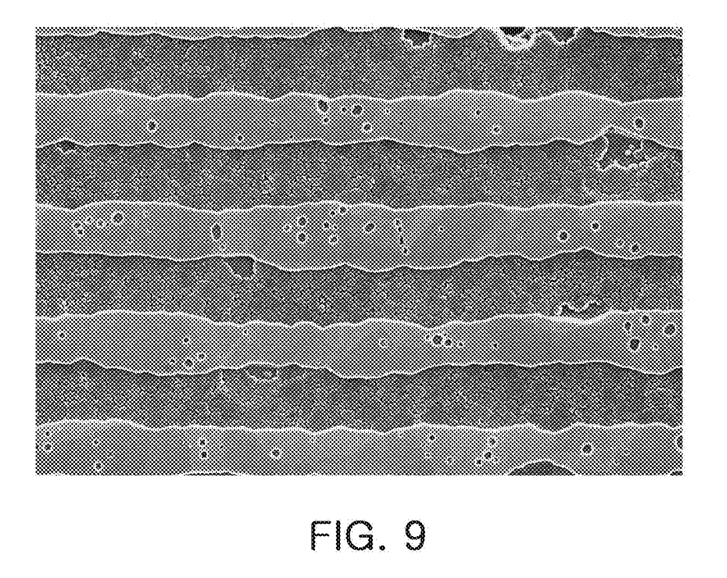
FIG. 9 is a cross-sectional view illustrating a body of a multilayer capacitor in which the dielectric layer contains 0.9 mol of Ca based on 100 mol of BT.
Figure 10:
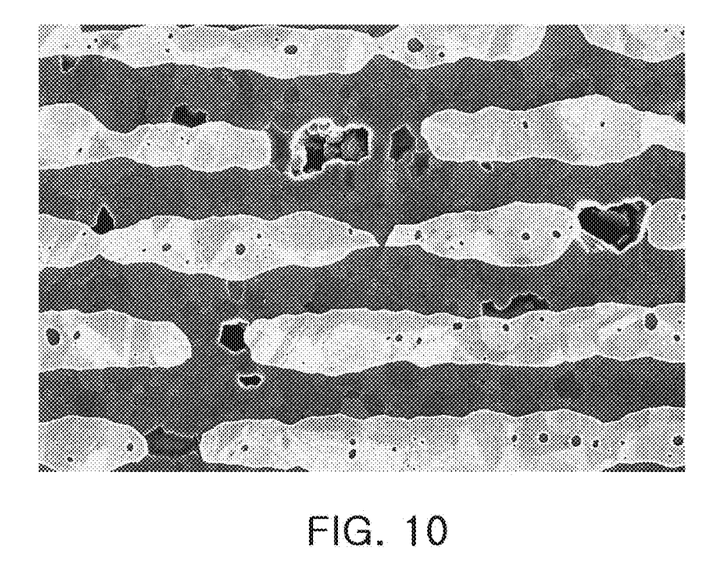
FIG. 10 is a cross-sectional view illustrating a body of a multilayer capacitor in which the dielectric layer contains 1.2 mol of Ca based on 100 mol of BT.
Figure 11:
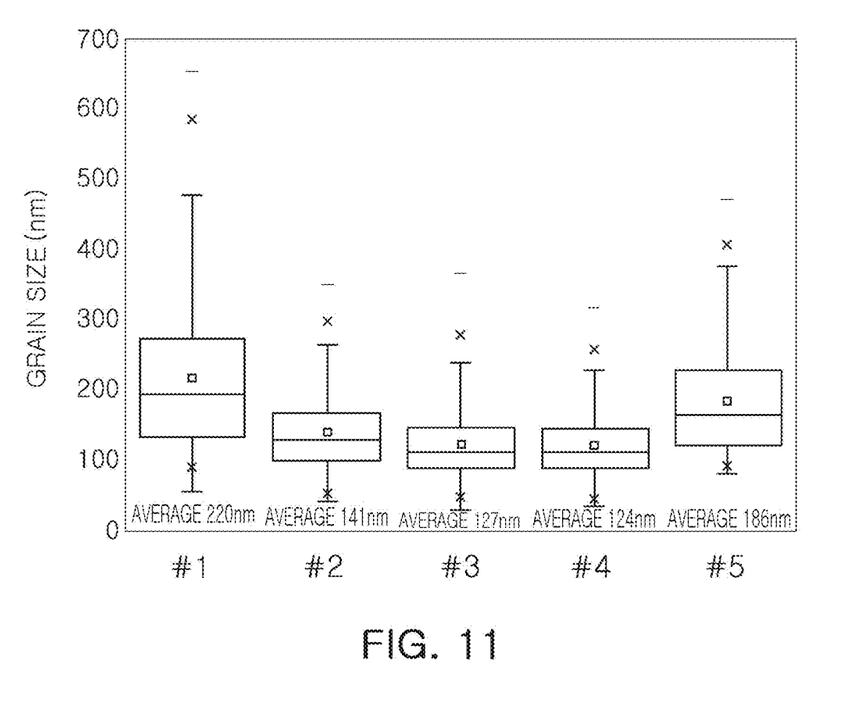
FIG. 11 is graphs illustrating degrees of change in grain sizes of the multilayer capacitors according to FIGS. 6 through 10, respectively.

FIG. 6 is a cross-sectional view illustrating a body of a multilayer capacitor in which the dielectric layer does not contain Ca, FIG. 7 is a cross-sectional view illustrating a body of a multilayer capacitor in which the dielectric layer contains 0.3 mol of Ca based on 100 mol of BT, FIG. 8 is a cross-sectional view illustrating a body of a multilayer capacitor in which the dielectric layer contains 0.6 mol of Ca based on 100 mol of BT, FIG. 9 is a cross-sectional view illustrating a body of a multilayer capacitor in which the dielectric layer contains 0.9 mol of Ca based on 100 mol of BT, FIG. 10 is a cross-sectional view illustrating a body of a multilayer capacitor in which the dielectric layer contains 1.2 mol of Ca based on 100 mol of BT, and FIG. 11 is graphs illustrating degrees of change in grain sizes of the multilayer capacitors according to FIGS. 6 through 10, respectively.

Referring to FIGS. 6 through 11, it can be seen that in a case of #3 in which a content of Ca was 0.6 mol and a case of #4 in which a content of Ca was 0.9 mol, grains were uniformly grown, such that average grain sizes were small sizes of 127 nm and 124 nm, respectively, and grain size dispersions were also decreased, such that that compactnesses of dielectric layers were high. In addition, in the case of #3 and #4, the numbers of pores confirmed in the dielectric layers were not large.

On the other hand, it can be seen that in a case of #1 in which the dielectric layer did not contain Ca, abnormal grain growth of grains was performed, such that an average grain size was a large size of 220 nm, and a grain size dispersion was also large.

It can be seen that in a case of #5 in which a content of Ca exceeded 0.9 mol, uniform grain growth of grains was not appropriately performed, such that a grain size was 186 nm, larger than those of #3 and #4, and a grain size dispersion also increased as compared with #3 and #4.

In addition, in a case of #2 in which a content of Ca was 0.3 mol, a grain size dispersion was small, and an average grain size was 141 nm, smaller than that of #1, but a large amount of pores were confirmed within the dielectric layer, and it was difficult to consider such a structure as a fine structure suitable for constituting a body of a multilayer capacitor.

Therefore, it can be seen that a content of Ca in which a compactness of the dielectric layer is excellent and which has a fine structure suitable for constituting a body of a multilayer capacitor is 0.6 to 0.9 mol based on 100 mol of barium titanate.

As set forth above, according to the exemplary embodiment in the present disclosure, the uniform non-grain growth system may be implemented, such that the decrease in the withstand voltage, the deterioration of the reliability, and the deterioration of the DC-bias characteristics of the multilayer capacitor may be significantly reduced even though a dielectric layer is formed at a small thickness.

While exemplary embodiments have been shown and described above, it will be apparent to those skilled in the art that modifications and variations could be made without departing from the scope of the present invention as defined by the appended claims.

What is claimed is:

1. A dielectric composition containing:
   barium titanate (BaTiO3);
   0.6 to 0.9 mol of calcium (Ca);
   0.5 to 1.5 mol of magnesium (Mg); and
   0.001 to 0.2 mol of terbium (Tb), based on 100 mol of barium titanate ($BaTiO_3$).

2. The dielectric composition of claim 1, further containing dysprosium (Dy).

3. The dielectric composition of claim 2, wherein dysprosium (Dy) is included in a form of oxide or carbonate.

4. The dielectric composition of claim 2, wherein a content of dysprosium (Dy) is 0.8 to 2.0 mol based on 100 mol of barium titanate ($BaTiO_3$).

5. The dielectric composition of claim 1, wherein a content of terbium (Tb) is 0.001 to 0.2 mol based on 100 mol of barium titanate ($BaTiO_3$).

6. The dielectric composition of claim 1, wherein terbium (Tb) is included in a form of oxide or carbonate.

7. A multilayer capacitor comprising:
   a body including dielectric layers and internal electrodes; and
   external electrodes disposed on the body so as to be connected to the internal electrodes,
   wherein the dielectric layer includes a plurality of dielectric grains each containing barium titanate ($BaTiO_3$), 0.6 to 0.9 mol of calcium (Ca), and 0.5 to 1.5 mol of magnesium (Mg), and 0.001 to 0.2 mol of terbium (Tb) based on 100 mol of barium titanate ($BaTiO_3$).

8. The multilayer capacitor of claim 7, wherein the dielectric grain further contains dysprosium (Dy).

9. The multilayer capacitor of claim 7, wherein an average thickness of the dielectric layer is 0.4 µm or less.

10. The multilayer capacitor of claim 7, wherein each of the dielectric grains has a size of 150 nm or less.

11. The multilayer capacitor of claim 7, wherein four or more layers of dielectric grains are disposed in the dielectric layer in a direction in which the dielectric layer is stacked.

12. The multilayer capacitor of claim 7, wherein the body includes first and second surfaces opposing each other, third and fourth surfaces connected to the first and second surfaces and opposing each other, and fifth and sixth surfaces connected to the first and second surfaces, and connected to the third and fourth surfaces, and opposing each other, and
   the first and second external electrodes exposed to the third and fourth surfaces of the body, respectively.

13. The multilayer capacitor of claim 12, wherein the external electrodes include:
   a pair of connected portions disposed on the third and fourth surfaces of the body, respectively; and
   a pair of band portions respectively extending from the pair of connected portions to the first surface of the body.

14. The multilayer capacitor of claim 12, wherein the body includes:
   an active region including the first and second internal electrodes; and
   upper and lower covers disposed on upper and lower surfaces of the active region, respectively.

\* \* \* \* \*